(12) United States Patent
White

(10) Patent No.: US 9,742,311 B2
(45) Date of Patent: Aug. 22, 2017

(54) SYSTEMS AND METHODS FOR CONTROLLING INVERTERS

(71) Applicant: Hamilton Sundstrand Corporation, Charlotte, NC (US)

(72) Inventor: Adam M. White, Belvidere, IL (US)

(73) Assignee: Hamilton Sundstrand Corporation, Charlotte, NC (US)

(*) Notice: Subject to any disclaimer, the term of this patent is extended or adjusted under 35 U.S.C. 154(b) by 55 days.

(21) Appl. No.: 14/874,116

(22) Filed: Oct. 2, 2015

(65) Prior Publication Data

US 2017/0099014 A1    Apr. 6, 2017

(51) Int. Cl.
*H02M 7/537* (2006.01)
*H02M 7/487* (2007.01)
*H02M 1/14* (2006.01)

(52) U.S. Cl.
CPC ........... *H02M 7/537* (2013.01); *H02M 7/487* (2013.01); *H02M 1/14* (2013.01)

(58) Field of Classification Search
CPC ........ H02M 7/487; H02M 7/483; H02M 1/14; H02M 1/15
See application file for complete search history.

(56) References Cited

U.S. PATENT DOCUMENTS

| | | | |
|---|---|---|---|
| 5,355,297 A | 10/1994 | Kawabata et al. | |
| 6,757,185 B2 | 6/2004 | Rojas Romero | |
| 6,795,323 B2 | 9/2004 | Tanaka et al. | |
| 7,986,538 B2 | 7/2011 | Harke | |
| 8,564,994 B2 | 10/2013 | Capitaneanu et al. | |
| 8,625,307 B2 | 1/2014 | Iwata et al. | |
| 8,929,111 B2 | 1/2015 | White | |
| 9,030,854 B2 | 5/2015 | Escobar et al. | |
| 2011/0141786 A1* | 6/2011 | Shen ..................... | H02M 7/487 363/131 |
| 2013/0163292 A1 | 6/2013 | Basic et al. | |
| 2014/0313804 A1* | 10/2014 | Urushibata ........... | H02M 7/487 363/132 |

FOREIGN PATENT DOCUMENTS

| | | | |
|---|---|---|---|
| EP | 2887517 A1 | 6/2015 | |
| FI | EP 2876793 A1 * | 5/2015 | ............. H02M 1/12 |

OTHER PUBLICATIONS

Extended European Search Report dated Feb. 2, 2017, issued during the prosecution of European Patent Application No. 16191913.9 (12 pages).

(Continued)

*Primary Examiner* — Harry Behm
(74) *Attorney, Agent, or Firm* — Locke Lord LLP; Scott D. Wofsy; Christopher J. Cillié

(57) ABSTRACT

A method of controlling an inverter includes receiving output voltage target waveforms for phases of an inverter, generating uncompensated midpoint duty cycle waveforms for the inverter phases, selecting an uncompensated midpoint duty cycle waveform for one of the inverter phases based on the magnitudes of the uncompensated midpoint duty cycle waveforms, and applying a compensation signal to the selected uncompensated midpoint duty cycle waveform. An inverter controller and inverter employ the method for generating switch command signals for solid-state switch devices of the inverter.

12 Claims, 7 Drawing Sheets

(56) References Cited

OTHER PUBLICATIONS

Zaragoza, J., et al., "Voltage-Balance Compensator for a Carrier-Based Modulation in the Neutral-Point-Clamped Converter", IEEE Transaction on Industrial Electronics, vol. 56, No. 2, Feb. 2009 (10 pages).

Pou, J., et al., "Fast-Processing Modulation Strategy for the Neutral-Point-Clamped Converter With Total Elimination of Low-Frequency Voltage Oscillations in the Neutral Point", IEEE Transactions on Industrial Electronics, vol. 54, No. 4, Aug. 2007 (7 Pages).

Busquets-Monge, S., et al., "Closed-Loop Control of a Three-Phase Neutral-Point-Clamped Inverter Using an Optimized Virtual-Vector-Based Pulsewidth Modulation", IEEE Transactions on Industrial Electronics, vol. 55, No. 5, May 2008 (10 pages).

Maheshwari, R., et al., "Design of Neutral-Point Voltage Controller of a Three-Level NPC Inverter With Small DC-Link Capacitors", IEEE Transactions on Industrial Electronics, vol. 60, No. 5, May 2013 (11 pages).

\* cited by examiner

SYSTEMS AND METHODS FOR CONTROLLING INVERTERS

BACKGROUND OF THE INVENTION

1. Field of the Invention

The present invention relates generally to power conversion, and more particularly power conversion using multi-level inverters.

2. Description of Related Art

Power systems commonly include solid-state power converters to convert power from one type to another type. Solid-state inverters, for example, convert DC power to AC power, generally by opening and closing solid-state switches connected between a DC positive lead and a DC return according to switch command signals applied to the inverter solid-state switch devices. The switch command signals cause the solid-state switch devices to synthesize a variable frequency output AC voltage from a constant frequency DC voltage applied through the DC positive and return leads. Some solid-state inverters have more than one level, generally created by a DC midpoint lead. DC midpoint leads typically connect to the DC positive lead and return lead through serially connected DC link capacitors, and create a DC midpoint that is about half the voltage difference between the DC positive and source leads. The solid-state switch devices of such multilevel inverters connect each AC output lead to the DC source, DC return and DC midpoint leads for converting the input DC voltage into AC output voltage, allowing the inverter to utilize components with voltage ratings that are less than the DC voltage applied the inverter. Oscillation in DC midpoint lead voltage can occur, and is influenced by the size of the DC link capacitors and/or the switching technique applied to solid-state switch devices.

Such conventional systems and methods have generally been considered satisfactory for their intended purpose. However, there is still a need in the art for improved solid-state power converters. The present disclosure provides a solution for this need.

SUMMARY OF THE INVENTION

A method of controlling an inverter includes receiving output voltage target waveforms for a plurality of inverter phases and generating uncompensated midpoint duty cycle waveforms for the inverter phases. An uncompensated midpoint duty cycle waveform for one of the inverter phases is selected for compensation based on the magnitudes of the uncompensated midpoint duty cycle waveforms, and a compensation signal is applied to the selected uncompensated midpoint duty cycle waveform.

In certain embodiments, the output voltage target reference waveforms can include A-phase, B-phase, and C-phase output target reference waveforms. The output voltage target reference waveforms can be out of cycle with one another such that peaks of respective output voltage target waveforms appear sequentially in time. The compensated midpoint duty cycle waveform can be used to generate a bias, and the bias applied to generate command signals for solid-state switch devices of a first inverter phase, e.g., the A-phase of the inverter. In embodiments, substantially no bias can be applied to command signals for solid-state switch devices of at least one second inverter phase, e.g., the B-phase and/or the C-phase of the inverter, during portions of the switching cycle.

In accordance with certain embodiments, selecting an uncompensated midpoint duty cycle waveform can include selecting a waveform with a magnitude that is greater than the magnitude of another of the waveforms. The selected uncompensated midpoint duty cycle waveform can have, at a given moment in time, a greater magnitude than two uncompensated midpoint duty cycle waveforms. The selected uncompensated midpoint duty cycle waveform can alternate between inverter phases in time, the waveform associated with the A-phase being selected during a first time interval, the waveform associated with the B-phase being selected during a subsequent time interval, and the waveform associated with the C-phase being selected during a time interval thereafter.

It is also contemplated that, in accordance with certain embodiments, applying the compensation signal can include generating compensation signals for each received target output voltage waveform. Applying the compensation signal can include applying a compensation signal to only the waveform with the greatest uncompensated midpoint duty cycle. Applying a compensation signal to the selected uncompensated midpoint duty cycle waveform can include reducing the magnitude of the selected waveform to about the average of both unselected uncompensated midpoint duty cycle waveforms.

An inverter controller includes a bias value generator module, a reference signal generator module connected to the bias value generator module, and a plurality of switch command signal generator modules connected to the reference signal module and a carrier wave module. The bias value generator module is configured to receive output voltage reference target waveforms, generate uncompensated midpoint duty cycle waveforms using the output voltage reference target waveforms for a plurality of inverter phases, select the phase associated with one of the generated uncompensated midpoint duty cycle waveform for compensation, and generate a bias signal for the selected inverter phase such that the bias signal reduces the magnitude of the midpoint duty cycle corresponding to the selected phase to an average of the unselected uncompensated midpoint duty cycle waveforms.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below, wherein.

DETAILED DESCRIPTION OF THE PREFERRED EMBODIMENTS

Figure 1:
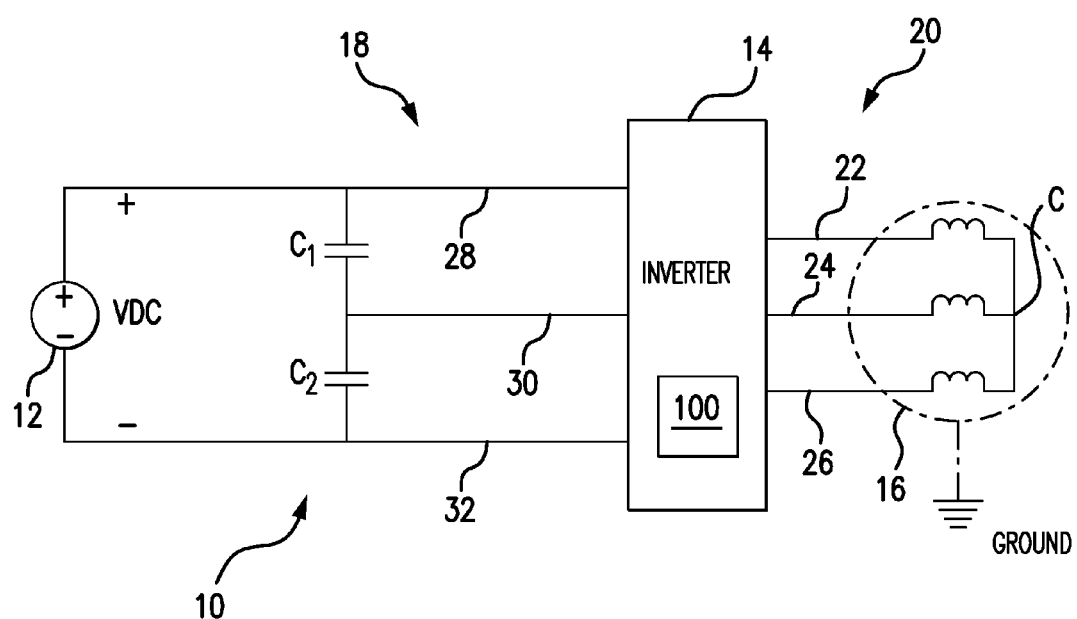
FIG. 1 is a schematic view of an exemplary embodiment of a neutral point clamped inverter constructed in accordance with the present disclosure, showing an inverter controller.

Reference will now be made to the drawings wherein like reference numerals identify similar structural features or aspects of the subject disclosure. For purposes of explanation and illustration, and not limitation, a partial view of an exemplary embodiment of an inverter in accordance with the disclosure is shown in FIG. 1 and is designated generally by reference character 14. Other embodiments of inverters, inverter controllers, and methods of controlling inverters accordance with the disclosure, or aspects thereof, are provided in FIGS. 2-8, as will be described. The systems and methods described herein can be used for power conversion systems, like neutral point clamped inverters in aircraft power systems.

Referring now to FIG. 1, a power distribution system 10 is shown. Power distribution system 10 includes a direct current (DC) power source 12, an inverter 14, and an electrical load 16. A DC link 18 with a plurality of leads couples DC power source 12 to inverter 14. An alternating current (AC) link 20 connects inverter 14 with electrical load 16. DC link 18 is a multilevel DC link, e.g., a three-level DC link, having a DC positive lead 28 and a DC return lead 32. A first balancing capacitor $C_1$ is connected in series between DC positive lead 28 and a DC midpoint lead 30. A second balancing capacitor $C_2$ is connected in series between DC return lead 32 and DC midpoint lead 30. In the illustrated exemplary embodiment inverter 14 is a multilevel neutral-point-clamped inverter with a plurality of solid-state switch devices (shown in FIG. 2) operatively connected to an inverter controller 100 and connected to a connected to DC power source 12 with a DC positive lead 28, and a DC return lead 32. Electrical load 16 is a three-phase AC load connected to inverter 14 through an A-phase lead 22, a B-phase lead 24, and a C-phase lead 26.

Ideally, the voltage difference between each pair of leads comprising DC link 18 are constant with respect to time during steady-state operation. However, in some power systems, drift error or ripple error in the DC midpoint lead voltage can be introduced by non-idealities in the operation of the inverter. Drift error may be controlled using a low bandwidth PI controller. Ripple error, generally at three times the fundamental frequency of the load, can be more difficult to control.

Oscillating currents flowing in the DC midpoint lead result in voltage ripple on the DC midpoint lead. One approach to address midpoint lead current oscillation, and thus DC midpoint voltage ripple, is to increase the size of the balancing capacitors coupling the DC midpoint lead 30 to DC positive lead 28 and/or DC return lead 32. While generally suitable for its intended purpose, increasing the size of the balancing capacitors can increase the weight of the power system employing the inverter. Other approaches to controlling DC midpoint lead current and voltage oscillation can increase common mode (i.e. zero-sequence) voltage on the inverter AC output, potentially requiring the use of relatively large common mode inductors, also increasing the weight of the power system employing the inverter.

Figure 2:
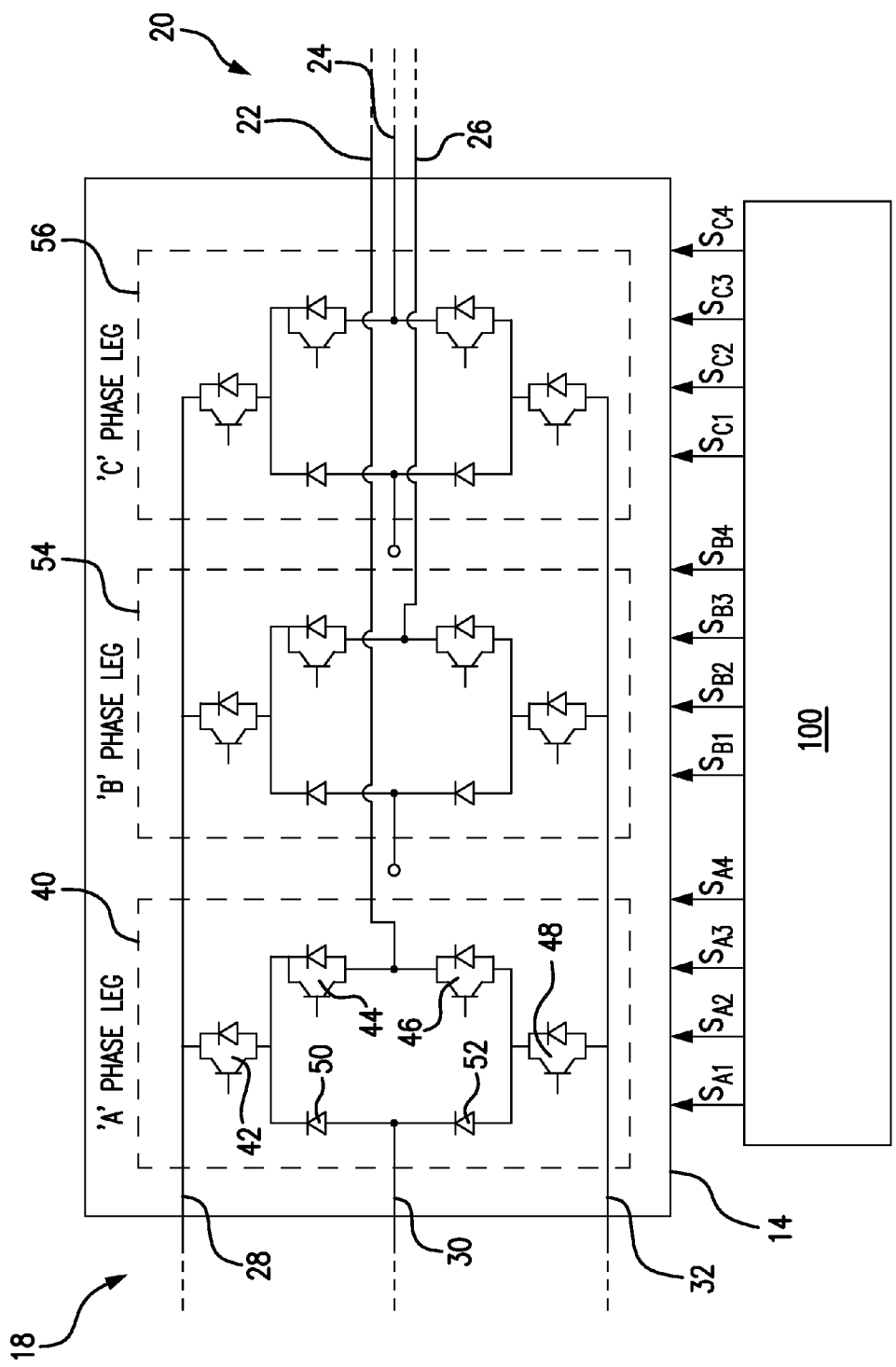
FIG. 2 is a schematic view of the inverter of FIG. 1, showing inverter switches operatively connected to the inverter controller and coupled between direct current (DC) link input leads and alternating current (AC) output leads.

With reference to FIG. 2, inverter 14 is shown. Exemplary inverter 14 generally includes three phase legs connected between the leads of DC link 18 and AC link 20. The phase legs, i.e. A-phase leg 40, B-phase leg 54, and C-phase leg 56, include four solid-state switch devices connected in series with one another and having freewheeling body diodes connected in parallel. Each of the phase legs also includes clamping diodes arranged in series between phase legs and DC midpoint lead 30. As illustrated, A-phase leg 40 includes an upper switch 42, a mid-upper switch 44, a mid-lower switch 46, and a lower switch 48 that each connect in series with one another between DC positive lead 28 and DC return lead 32. A first clamping diode 50 is connected in series between upper switch 42 and DC midpoint lead 30, and a second clamping diode 52 is connected is series between lower switch 48 and DC midpoint lead 30. A-phase lead 22 is connected between mid-upper switch 44 and mid-lower switch 46. B-phase leg 54 and C-phase leg 56 are similar in arrangement as A-phase leg 40 with the distinction that B-phase leg 54 is connected to B-phase lead 24 and C-phase leg 56 is connected to C-phase lead 26.

Inverter controller 100 is operatively connected to the solid-state switching devices of the phase legs of inverter 14 for selectively connecting each of AC phase leads (i.e. A-phase lead 22, B-phase lead 24, and C-phase lead 26) with one of the DC leads (i.e. DC positive lead 28, DC midpoint lead 30, and DC return lead 32) at a given moment in time for synthesizing AC power with predetermined frequency from DC power supplied through DC link 18. In this respect inverter controller 100 generates command signals that selectively open and close the solid-state switch devices according to a predetermined pulse-width modulation (PWM) scheme. For example, inverter controller 100 selectively connects each AC output lead to DC positive lead 28, DC return lead 32, or DC midpoint lead 30 as required in order to generate the desired AC output waveforms.

Proper selection of the control signals allows inverter controller 100 to reduce or eliminate midpoint current ripple otherwise generated by inverter 10. In this way, midpoint voltage oscillation that could otherwise occur on DC midpoint lead 30 with respect to DC return lead 32 and DC source lead 28 is prevented. In embodiments, relative to phase disposition (PD) switch modulation schemes, the number of on/off switching events for each of the inverter solid-state switches is increased by about two thirds, and in some embodiments is increased by one-third relative to the number of switching events for the same carrier wave frequency of the PD modulation scheme.

Figure 3:
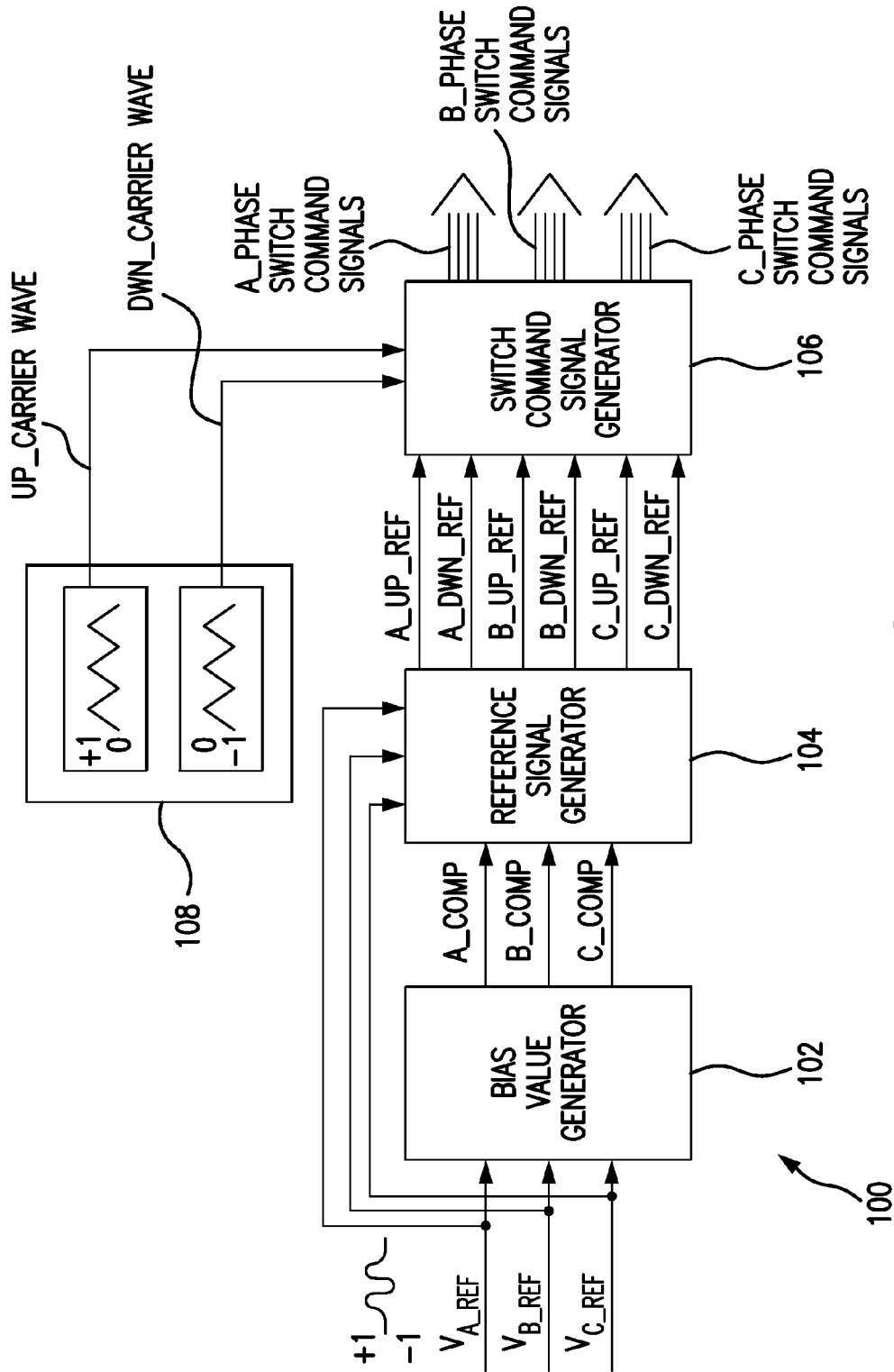
FIG. 3 is a logic flow diagram for the controller of FIG. 1, showing a switch command signal generator module, a carrier wave signal reference module, a reference signal generator module, and a bias value generator module.

With reference to FIG. 3, inverter controller 100 is shown. In the illustrated embodiment, inverter controller 100 generally includes a bias value generator module 102, a reference signal generator module 104, a switch command signal generator module 106, and a carrier wave generator module 108. Inverter controller 100 provides a method of reducing (or eliminating) oscillations in the midpoint current flowing through DC midpoint lead 30 (shown in FIG. 2). It is to be appreciated and understood that inverter controller 100 may be implemented as circuitry, software, or a combination of software and circuitry.

Bias value generator module 102 receives voltage target waveforms (i.e. $V_{A\_Ref}$, $V_{B\_Ref}$, and $V_{C\_Ref}$) that represent predetermined output voltage targets for each of the output AC phases of inverter 14 (shown in FIG. 1). The target waveforms may be generated by a motor control algorithm (e.g., field oriented control) that receives one or more feedback signals used to control the generation of the AC phase outputs of inverter 14. Examples of feedback signals include monitored AC output current, monitored AC output frequency, monitored DC link voltage, monitored DC link current, or a combination thereof.

Bias value generator module 102 generates compensation signals (i.e. A_COMP, B_COMP, and C_B_COMP) which are associated with respective phases of inverter 14 (shown in FIG. 1) and provides the compensation signals to reference signal generator module 104. Reference signal generator module 104 receives the compensation signal (i.e. A_COMP, B_COMP, and C_COMP) and the target waveforms (i.e. $V_{A\_Ref}$, $V_{B\_Ref}$, and $V_{C\_Ref}$). Using the received target waveforms and the compensation signals, reference signal generator module 104 generates a pair of reference signal waveforms (e.g., A_UP_REF and A_DWN_REF) for each of the phase legs of inverter 14 (shown in FIG. 2), and provides the reference signal waveforms to switch command signal generator module 106.

Switch command signal generator module 106 receives reference signal waveforms and first and second carrier waveforms (e.g. UP_CARRIER and DWN_CARRIER) from carrier wave generator 108 and compares the reference signal waveforms to the carrier waveforms using a pulse width modulation (PWM) comparison engine to generate switch command signals (i.e. A-Phase Switch Command Signals, B-Phase Switch Command Signals, C-Phase Switch Command Signals) for the solid-state switch devices of the phase legs of inverter 14 (shown in FIG. 2). The carrier waves generated by carrier wave signal generator 108 may be triangle waves. The command signals may each be a binary high-low signal that closes and opens the solid-state switch device receiving the switch command signal.

Figure 4:
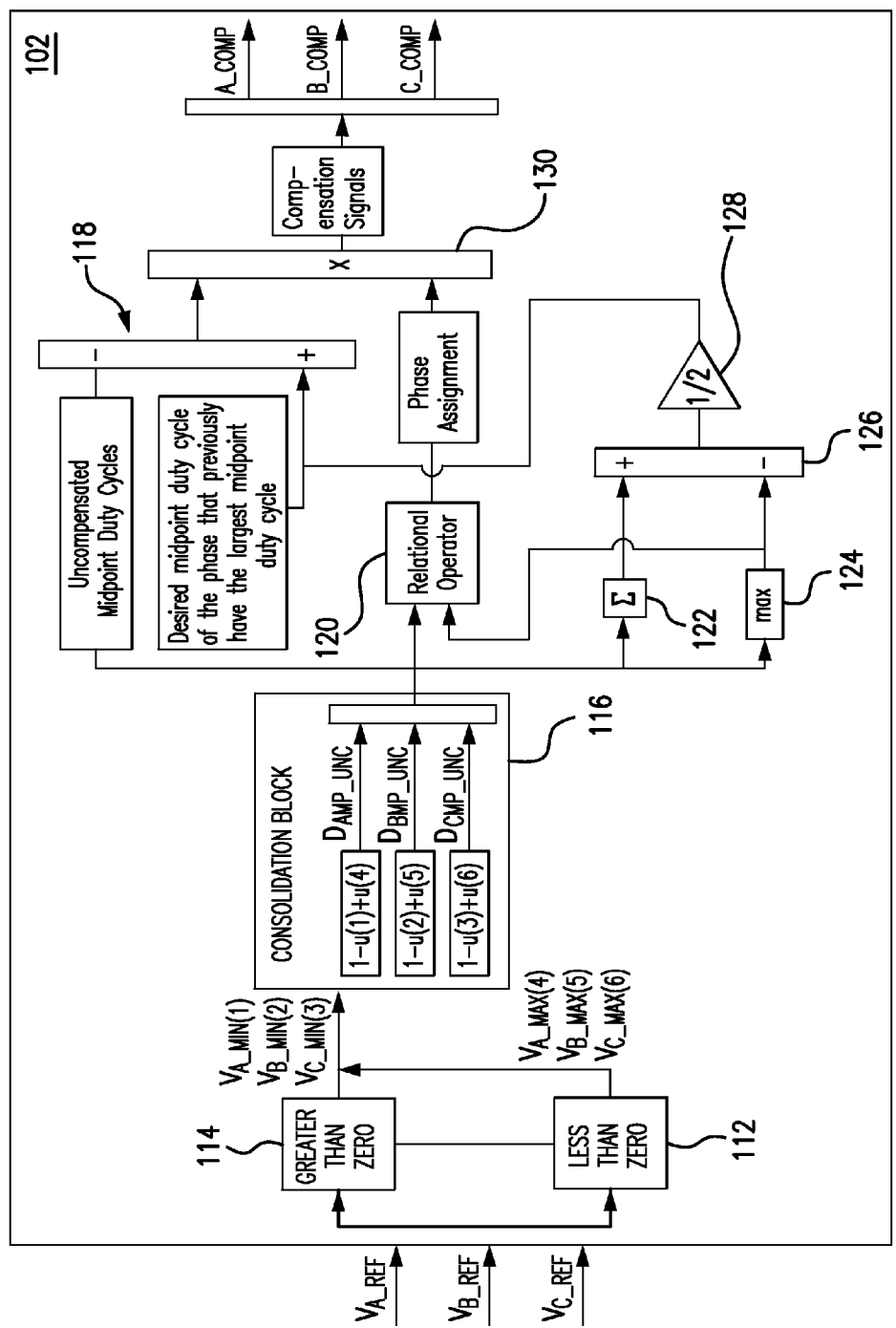
FIG. 4 is a logic flow diagram of the bias signal generator module of FIG. 3, showing signals and logical blocks used to generate compensation signals.

With reference to FIG. 4, a logic flow diagram for bias value generator module 102 is shown. Bias value generator module 102 includes a greater-than-zero block 114, a less-than-zero block 112, and a consolidation block 116. Bias value generator module 102 also includes a first difference block 118, a relational operator block 120, a summing block 122, and a max block 124 that are connected to consolidation block. A second difference block 126 is connected to summing block 122 and max block 124, a gain block 128 is connected between second difference block 126 and first difference block 118, and a multiplier module 130 is connected to relational operation 120 and first difference block 118.

Greater-than-zero block 114 and less-than-zero block 112 both receive voltage target waveforms for each of the phases of inverter 10 (shown in FIG. 1), i.e. $V_{A\_Ref}$, $V_{B\_Ref}$ and $V_{C\_Ref}$. Greater-than-zero block 114 generates positive-valued signals, i.e. $V_{A\_Min(1)}$, $V_{B\_Min(2)}$, and $V_{C\_Min(3)}$, by replacing negative values in the received target waveforms with zero and provides the positive-valued signals to consolidation block 116. Less-than-zero block 112 generates negative-valued signals, i.e. $V_{A\_Max(4)}$, $V_{B\_Max(5)}$, and $V_{C\_Max(6)}$, by replacing positive values in the received target waveforms with zero and provides the negative-valued signals to consolidation block 116.

Consolidation block 116 consolidates the greater-than-zero and less-than-zero signals for each inverter phase and generates uncompensated midpoint duty cycle waveforms for each phase, i.e. $D_{A\_MP\_UNC}$, $D_{B\_MP\_UNC}$, and $D_{C\_MP\_UNC}$. The uncompensated midpoint duty cycle waveforms for the A-phase, i.e. $D_{A\_MP\_UNC}$, is generated by subtracting the great than zero signal for the A-Phase, i.e. $V_{A\_Min(1)}$, from one and adding the A-phase less-than-zero signal, i.e. $V_{A\_Max(4)}$. The uncompensated midpoint duty cycle waveforms for the B-phase, i.e. $D_{B\_MP\_UNC}$, is generated by subtracting the greater-than-zero signal for the B-Phase, i.e. $V_{B\_Min(2)}$, from one and adding the B-phase less-than-zero signal, i.e. $V_{B\_Max(5)}$. The uncompensated midpoint duty cycle waveform for the C-phase, i.e. $D_{C\_MP\_UNC}$, is generated by subtracting the greater-than-zero for the C-Phase, i.e. $V_{C\_Min(3)}$ from one and adding the C-phase less-than-zero signal, i.e. $V_{C\_Max(6)}$.

Summation block 122 receives the uncompensated midpoint duty cycle waveforms for each inverter phase, i.e. $D_{A\_MP\_UNC}$, $D_{B\_MP\_UNC}$, and $D_{C\_MP\_UNC}$, adds the uncompensated midpoint duty cycle waveforms for all phases together, and provides the sum of the uncompensated midpoint duty cycle waveforms to a positive terminal of first difference block 126. Max block 120 also receives the uncompensated midpoint duty cycle waveforms, i.e. $D_{A\_MP\_UNC}$, $D_{B\_MP\_UNC}$, and $D_{C\_MP\_UNC}$, and provides the maximum of the uncompensated midpoint duty cycle waveforms for all phases to both relational operator block 124 and a negative terminal of first difference block 126.

Second difference block 126 subtracts the maximum of the uncompensated midpoint duty cycle waveforms from the sum of the uncompensated midpoint duty cycle waveforms and provides the difference to amplifier block 128. Amplifier block 128 applies a gain, e.g., a 0.5 gain, to the difference provided by second difference block 126, thereby calculating the average uncompensated midpoint duty cycle of the phases with the smallest uncompensated midpoint duty cycles. The average uncompensated midpoint duty cycle represents the desired compensated midpoint duty cycle for the phase with the largest value of uncompensated midpoint duty cycle, which gain block 128 provides to a positive terminal of a first difference block 118.

First difference block 118 receives the uncompensated midpoint duty cycle waveforms, i.e. $D_{A\_MP\_UNC}$, $D_{A\_MP\_UNC}$, and $D_{C\_MP\_UNC}$, subtracts the uncompensated midpoint duty cycle waveforms received from the desired midpoint duty cycle phase that previously have the largest midpoint duty cycle received from gain module 128, and provides the difference of the signals to multiplier block 130. The output of first difference block 118 is the value of the midpoint duty cycle compensation for each phase required in order to make the midpoint duty cycle for that phase equal in value to the average of the lowest two uncompensated midpoint duty cycles.

Relational block 124 selects the phase assigned for compensation at any given moment by comparing the uncompensated midpoint duty cycle waveforms received from consolidation block 116 with the maximum value of the uncompensated midpoint duty cycle waveforms received from max block 120. Relational block 124 outputs zero for the two phases that do not have the maximum uncompensated midpoint duty cycles, and one for the phase that has the maximum uncompensated midpoint duty cycle. As will be appreciated, the value assigned to a given phase changes during in the inverter duty cycle according to the relative magnitude of the inverter phase uncompensated midpoint duty cycles. Multiplier block 130 receives the difference of the uncompensated midpoint duty waveforms and desired compensated midpoint duty cycle for the phase with the largest uncompensated midpoint duty cycle from first difference block 118 and a phase assignment for compensation signal from relational operator block 120, and combines the signals, and outputs the result as the midpoint duty cycle compensation signal for each phase of inverter 14 (shown in FIG. 1), i.e. A_COMP, B_COMP, and C_COMP. As will be appreciated by those of skill in the art in view of the present disclosure, because multiplier block 130 receives a non-zero value (i.e. one) for only the phase with the maximum uncompensated midpoint duty cycles at any given moment, only one of the three phase of inverter 14 (shown in FIG. 1) is compensated at any moment in time.

Figure 5:
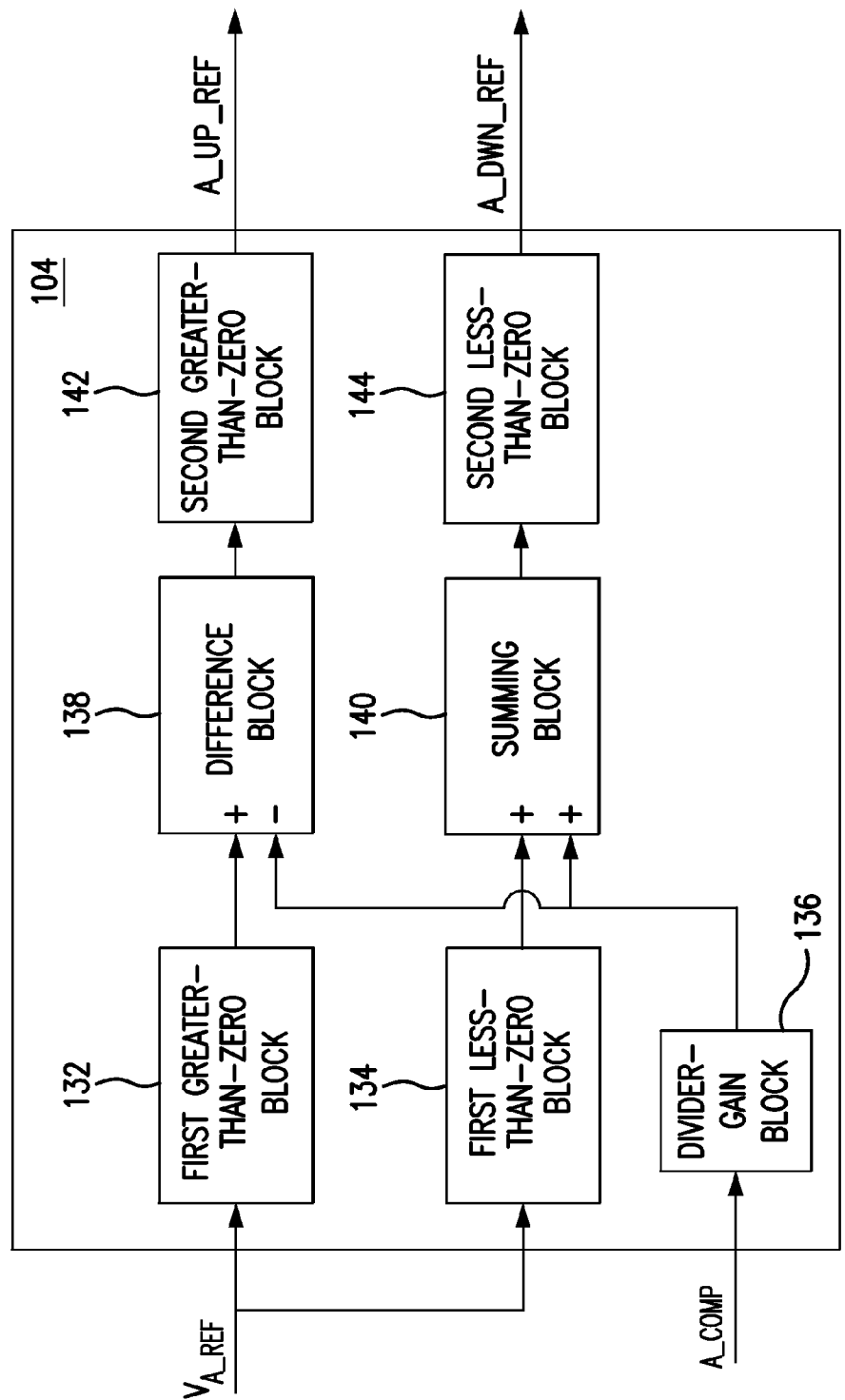
FIG. 5 is a logic flow diagram corresponding to a single phase subset of the reference signal generator module of FIG. 3, showing the signals and logical blocks used to generate the inverter switch reference signals.

With reference to FIG. 5, a logic flow diagram for reference signal generator module 104 is shown. Reference signal generator module 104 includes a first greater-than-zero block 120, a difference block 138, and a second greater-than-zero block 142. Reference signal generator module 104 also includes a first less-than-zero block 122, a summing block 140, a second less-than-zero block 144, and a divider-gain block 136. While a reference signal generator for the inverter A-phase is shown, it is to be understood and appreciated that reference signal generator module 104 also includes logic blocks for the inverter B-phase and C-phase.

Reference signal generator module 104 receives the target waveform (e.g., $V_{A\_REF}$) at both first greater-than-zero block 120 and first less-than-zero block 122. First greater-than-zero block 120 replaces negative waveform values with zero and provides the resulting waveform to a positive terminal of difference block 138. First less-than-zero block 122 replaces positive waveform values in the phase target output voltage waveform with zero and provides the resulting waveform to a positive terminal of summing block 140. Divider-gain block 136 receives the compensation waveform for the phase (e.g., A_COMP) from bias value generator module 102 (shown in FIG. 4), divides compensation waveform values by two by applying a one-half gain to compensation waveform, and provides the gained compensation waveform to a negative terminal of difference block 138 and to a positive terminal of summing block 140

Difference block 138 subtracts the gained compensation waveform received from first greater-than-zero block 120 and provides the resultant waveform to second greater-than-zero block 142. Second greater-than-zero block 142 replaces negative waveform values with zero and provides the resulting waveform to switch command signal generator module 106 as a first reference signal (i.e. A_UP_REF), which is representative of a desired duty cycle for the upper switch of the phase leg, i.e. upper solid-state switch device 42 (shown FIG. 2).

Summing block 140 adds the gained compensation waveform received from first less-than-zero block 122, and provides the sum of the waveforms to second less-than-zero block 144. Second less-than-zero block 144 replaces positive waveform values with zero and also provides the resulting waveform to switch command signal generator module 106 as a second switch reference signal (i.e. A_DWN_REF).

Figure 6:
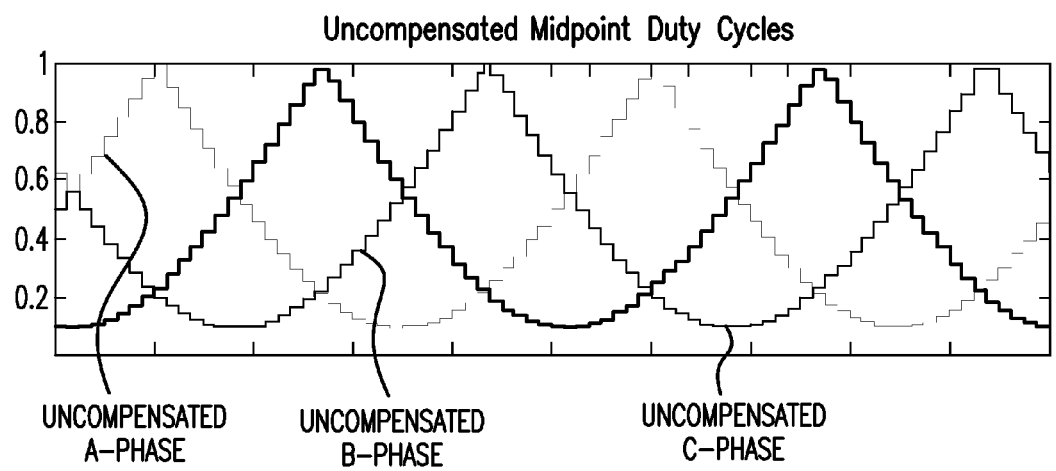
FIG. 6 is a graph of the uncompensated midpoint duty cycles of the inverter phases.

With reference to FIG. 6, uncompensated midpoint duty cycle waveforms for the phase of inverter 14 are shown. As illustrated, the current ripple in the DC midpoint lead is non-zero. While each of the three phases contribute to the current ripple during the cycle, a single inverter phase is generally responsible for the majority of the ripple current flow at any given moment during the cycle. The inverter phase responsible for the majority of the ripple current changes during the inverter cycle, shown by the sequence of peaks appearing in FIG. 6 associated with individual inverter phases.

Figure 7:
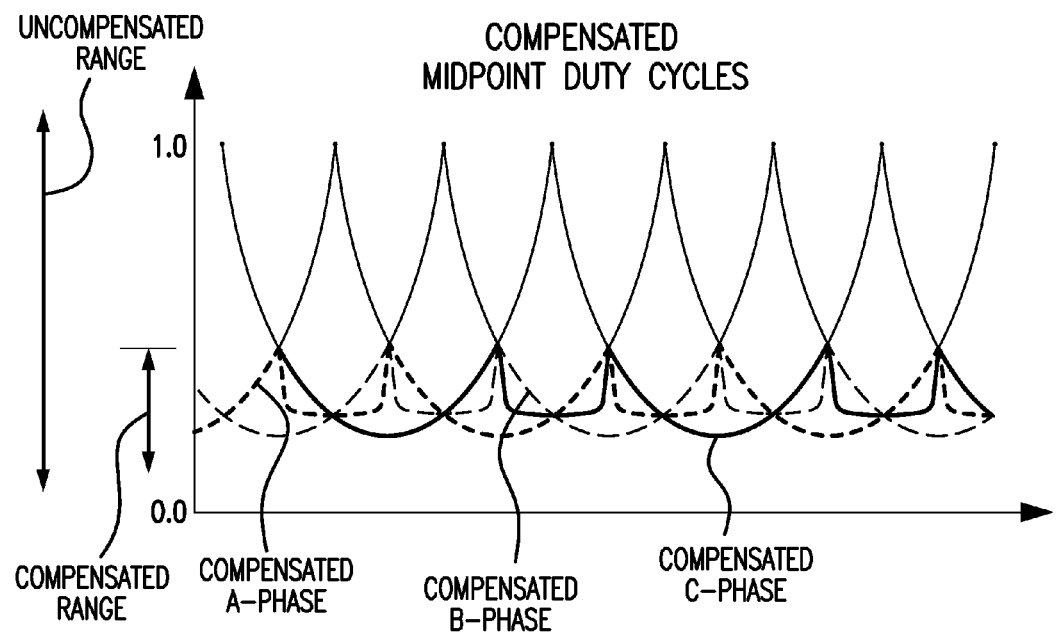
FIG. 7 is a graph showing the compensated midpoint duty cycles of the inverter phases, showing a reduction in the range of the midpoint duty cycles of the inverter phases.

With reference to FIG. 7, current ripple flow in the DC midpoint lead can be reduced when the midpoint duty cycles for each phase are equal. In order to reduce current ripple flow in the DC midpoint lead, the PWM reference signals associated with at least two of the inverter phases can be changed. While satisfactory for its intended purpose of reducing current ripple flow in the DC midpoint lead, the modified PWM reference signals can increase the switching losses of the inverter due to the controls applied for current ripple mitigation.

Figure 8:
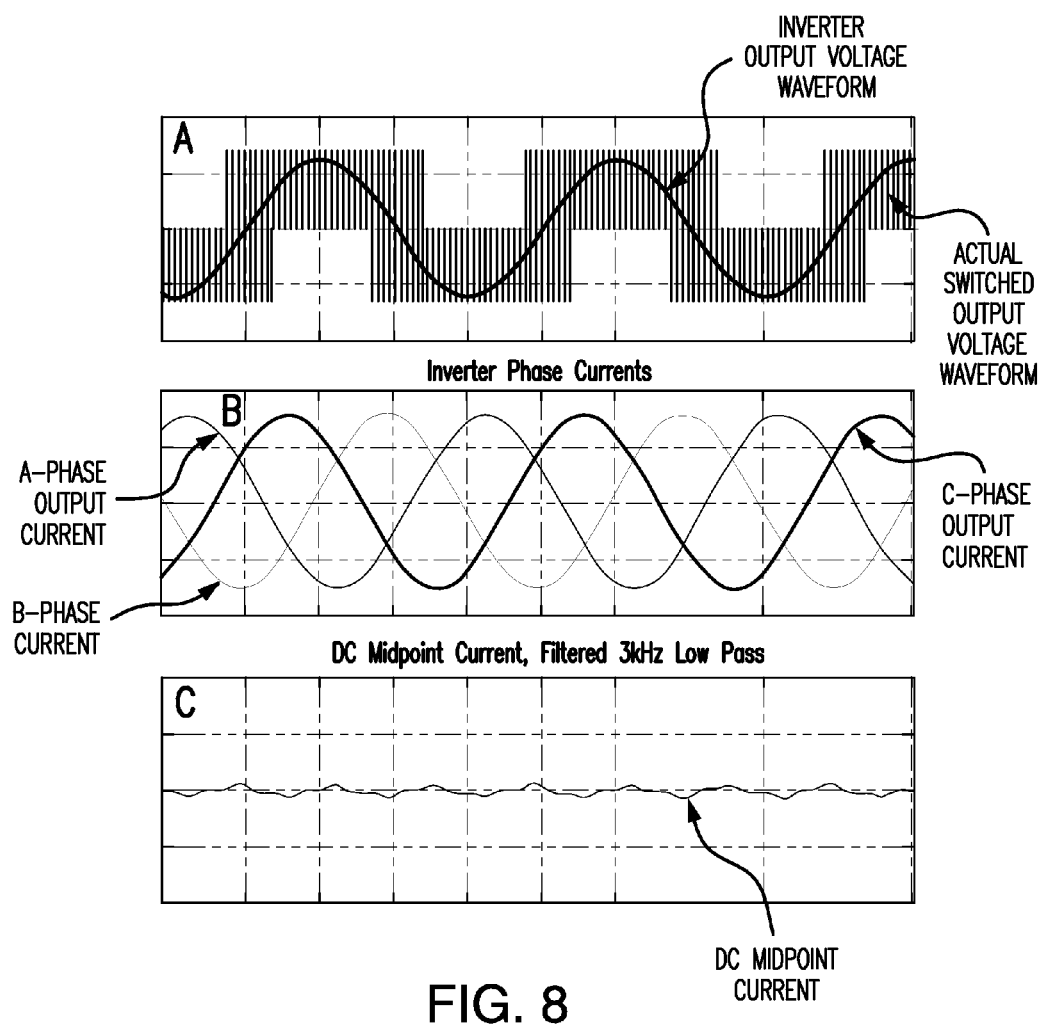
FIG. 8 is a set of graphs showing the sinusoidal output voltage target reference waveform and the actual switched output voltage waveform corresponding to one inverter phase in graph A, inverter phase output currents in graph B, and DC midpoint current in graph C, all with respect to time on the respective x-axes.

Current ripple flow in the DC midpoint lead is reduced, albeit not eliminated, when the variation between the minimum and maximum midpoint duty cycles is minimized. Since a single phase is generally responsible for the maximum midpoint duty cycle at a given time, the variation between the minimum and maximum midpoint duty cycles, and thus the DC midpoint lead current ripple, can be reduced, as shown in FIG. 8, by compensating the midpoint duty cycle of the phase with the largest uncompensated midpoint duty cycle such that the phase with the otherwise largest uncompensated midpoint duty cycle is equivalent to the average of the two unselected uncompensated midpoint duty cycle waveforms. This provides significant current ripple flow reduction with modification of a single PWM reference signal, which commensurately reduces the switching losses associated with controls applied for current ripple mitigation.

In embodiments described herein, only the inverter phase with the greatest uncompensated midpoint duty cycle at a given moment in time is identified and compensated. The compensation is such that the midpoint duty cycle magnitude of the phase that would otherwise have the greatest midpoint duty cycle is equal to the average of the uncompensated midpoint duty cycles of the remaining inverter phases. In this respect, the phase with the uncompensated midpoint duty cycle that would otherwise drive the total range of inverter uncompensated midpoint duty cycles is selectively compensated, and is driven to the mean of the uncompensated midpoint duty cycle of the remaining phases. Consequently, the range between the minimum and maximum midpoint duty cycles for each of the phase is reduced. As will be appreciated by those of skill in the art in view of the present disclosure, the assigned phase for compensation changes throughout each inverter output voltage fundamental cycle according to the maximum uncompensated midpoint duty cycle for each of the phases of the inverter.

In embodiments, the PWM method disclosed herein reduces or eliminates ripple in the inverter DC midpoint voltage, and particularly ripple in the inverter DC midpoint voltage with a frequency of about three times the frequency of the AC power applied to the output leads. In certain embodiments, ripple is reduced by minimizing current flow on the DC midpoint lead, allowing for the capacitor voltages to remain balanced. The resulting voltage target waveform, inverter output voltage waveform, inverter output current waveforms, and DC midpoint voltage during an exemplary period of inverter operation are shown in FIG. 8.

The methods and systems of the present disclosure, as described above and shown in the drawings, provide for power converters with superior properties including reduced DC midpoint lead current. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method of controlling an inverter, comprising:
receiving output voltage target waveforms for a plurality of inverter phases;
generating uncompensated midpoint duty cycle waveforms for the inverter phases;
selecting an uncompensated midpoint duty cycle waveform for one of the inverter phases; and
applying a compensation signal to the selected uncompensated midpoint duty cycle waveform, wherein selecting an uncompensated midpoint duty cycle waveform includes selecting a waveform with a magnitude that is greater than the magnitude of another of the waveforms.

2. The method as recited in claim 1, wherein the output voltage target waveforms include an A-phase output voltage target waveform, a B-phase output target waveform; and a C-phase output target waveform.

3. The method as recited in claim 1, wherein generating uncompensated midpoint duty cycle waveforms includes generating waveforms that are out of cycle with one another.

4. The method as recited in claim 1, wherein applying the compensation signal includes generating compensation signals for each received target output voltage waveform.

5. The method as recited in claim 1, wherein current flow through the inverter DC midpoint lead is substantially reduced using the compensation signal applied to the selected uncompensated midpoint duty cycle waveform.

6. A method of controlling an inverter, comprising:
receiving output voltage target waveforms for a plurality of inverter phases;
generating uncompensated midpoint duty cycle waveforms for the inverter phases;
selecting an uncompensated midpoint duty cycle waveform for one of the inverter phases; and
applying a compensation signal to the selected uncompensated midpoint duty cycle waveform, wherein selecting an uncompensated midpoint duty cycle waveform includes, at a given moment, selecting the uncompensated midpoint duty cycle that has the greatest magnitude of the uncompensated midpoint duty cycles.

7. A method of controlling an inverter, comprising:
receiving output voltage target waveforms for a plurality of inverter phases;
generating uncompensated midpoint duty cycle waveforms for the inverter phases;
selecting an uncompensated midpoint duty cycle waveform for one of the inverter phases; and
applying a compensation signal to the selected uncompensated midpoint duty cycle waveform, wherein applying the compensation signal includes a applying a compensation signal to only the waveform with the greatest midpoint duty cycle.

8. A method of controlling an inverter, comprising:
receiving output voltage target waveforms for alit of inverter phases;
generating uncompensated midpoint duty cycle waveforms for the inverter phases;
selecting an uncompensated midpoint duty cycle waveform for one of the inverter phases; and
applying a compensation signal to the selected uncompensated midpoint duty cycle waveform, wherein applying a compensation signal to the selected midpoint duty cycle waveform includes reducing magnitude of the selected waveform to an average of the unselected uncompensated midpoint duty cycle waveforms.

9. A method of controlling an inverter, comprising:
receiving output voltage target waveforms for a plurality of inverter phases;
generating uncompensated midpoint duty for the inverter phases;
selecting an uncompensated midpoint duty cycle waveform for one of the inverter phases; and
applying a compensation signal to the selected uncompensated midpoint duty cycle waveform,
generating command signals for a first phase using the compensated midpoint duty cycle waveform; and
generating command signals for a second phase using at least one uncompensated midpoint duty waveform.

10. An inverter controller, comprising:
a bias value generator;
a reference signal generator connected to the bias value generator; and
a switch command signal generator connected to the reference signal generator, wherein the bias value generator module is configured to:
receive output voltage target waveforms for phases of an inverter;
generate uncompensated midpoint duty cycle waveforms using the output voltage target waveforms for the inverter phases;
select one of the generated uncompensated midpoint duty cycle waveforms for compensation; and
apply a compensation signal to the selected uncompensated midpoint duty cycle waveform, wherein the compensation signal reduces a magnitude to the selected midpoint duty cycle to an average of the unselected uncompensated midpoint duty cycle waveforms.

11. The inverter controller as recited in claim 10, wherein a first of the switch command signal generator modules is configured to generate switch command signals using the compensated midpoint duty cycle waveform at the same time that a second of the switch command signal generator modules generates switch command signals using one of the uncompensated midpoint duty cycle waveforms.

12. The inverter controller as recited in claim 10, wherein current flow through a DC link midpoint lead connected to the inverter is substantially zero while inverting input DC voltage into output AC voltage.

* * * * *